(12) United States Patent
MacKarvich

(10) Patent No.: US 6,854,755 B2
(45) Date of Patent: Feb. 15, 2005

(54) BOAT TRAILER WITH CLOSED LONGITUDINAL SUPPORT BEAMS

(76) Inventor: Charles J. MacKarvich, 3940 Paces Manor Dr., Atlanta, GA (US) 30339

(*) Notice: Subject to any disclaimer, the term of this patent is extended or adjusted under 35 U.S.C. 154(b) by 0 days.

(21) Appl. No.: 10/465,350

(22) Filed: Jun. 19, 2003

(65) Prior Publication Data

US 2004/0256836 A1 Dec. 23, 2004

(51) Int. Cl.$^7$ ................................................ B60P 3/10
(52) U.S. Cl. ..................................... 280/414.1; 280/782
(58) Field of Search ............................ 280/789, 782, 280/800, 414.1; 296/191, 208

(56) References Cited

U.S. PATENT DOCUMENTS

| | | | |
|---|---|---|---|
| 1,848,895 A | | 3/1932 | MacPherson |
| 2,551,528 A | * | 5/1951 | Darrin ........................ 454/143 |
| 3,022,090 A | | 2/1962 | Olney ......................... 280/414 |
| 3,084,971 A | * | 4/1963 | Schilberg ................... 296/35.1 |
| 3,302,350 A | * | 2/1967 | Brown et al. ............... 52/288.1 |
| 3,735,998 A | | 5/1973 | Green ......................... 280/106 |
| 3,869,012 A | * | 3/1975 | Schubach .................... 180/11 |
| 4,040,640 A | | 9/1977 | Begg .......................... 280/106 |
| 4,395,749 A | * | 7/1983 | Poveromo ................... 362/485 |
| 5,209,541 A | | 5/1993 | Janotik ......................... 296/29 |
| 5,215,331 A | | 6/1993 | Pittman ....................... 280/788 |
| 5,476,303 A | | 12/1995 | Sakamoto et al. ........... 296/204 |
| 5,725,228 A | * | 3/1998 | Livingston ............... 280/414.1 |
| 5,823,569 A | * | 10/1998 | Scott ........................... 280/781 |
| 6,109,639 A | * | 8/2000 | Blassingame et al. ... 280/414.1 |
| 6,113,124 A | * | 9/2000 | Chambers ................ 280/414.1 |
| 6,286,868 B1 | | 9/2001 | von Mayenburg .......... 280/800 |
| 6,299,210 B1 | | 10/2001 | Ruehl et al. ................ 280/800 |

FOREIGN PATENT DOCUMENTS

DE                 4211410 A1  * 10/1993   ........... B62D/21/02

* cited by examiner

Primary Examiner—Daniel G. DePumpo
(74) Attorney, Agent, or Firm—Thomas, Kayden, Horstemeyer & Risley

(57) ABSTRACT

A frame of a boat trailer includes longitudinal support beams that extend from a tongue. The support beams are C-shaped in cross section and have a generally hollow interior. Each one of the support beams includes a front wall with a slot formed therethrough; the slot runs the length of the support beam and provides access to the hollow interior. Electrical wiring and hydraulic brake fluid lines are disposed in the interior of the support beams for protection from the elements, road debris, and other hazards. Each of the support beams is removably coupled to side panel such that the side panel covers the slot formed in the support beam.

16 Claims, 2 Drawing Sheets

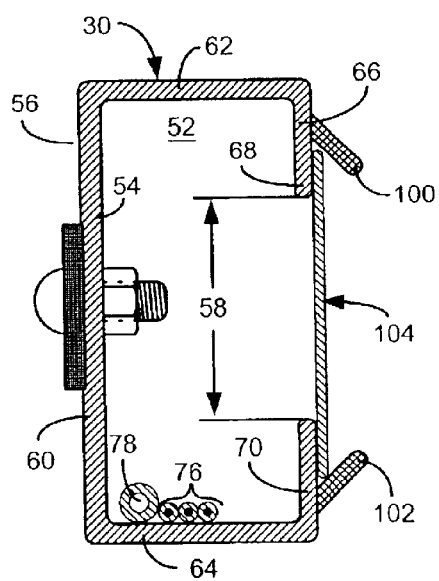 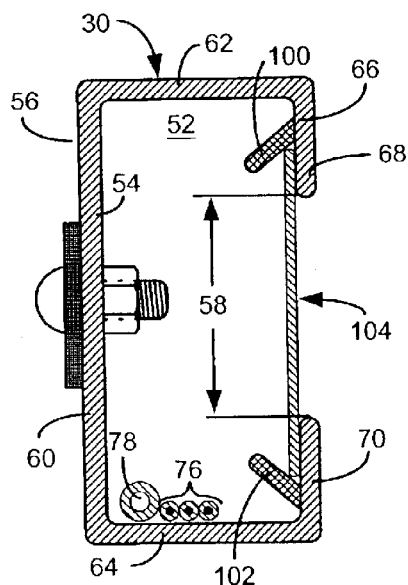
FIG. 4A    FIG. 4B

BOAT TRAILER WITH CLOSED LONGITUDINAL SUPPORT BEAMS

TECHNICAL FIELD

The present invention concerns trailers and, more particularly, concerns boat trailers with parallel support beams that contain the electrical wiring and hydraulic lines out of view within support beams.

BACKGROUND OF THE INVENTION

Conventional boat trailers have long been known and are generally used for, but not limited to, carrying boats, and particularly, powerboats. Typically, a conventional boat trailer includes a frame mounted on wheels and adjustable support elements, called bunk boards, on which the hull of a boat rests. The frame of a boat trailer typically is made of steel beams of C-shape cross section having a hollow interior. The surfaces of frames made from regular, or non-galvanized, steel tubes usually are painted so as to make them more aesthetic and to protect them from rusting.

Conventional boat trailers also include brake-light/turn-signal assemblies that are in electrical communication with a towing vehicle via electrical wiring. On a conventional boat trailer, the electrical wiring can be disposed on the interior surface of the C-shaped frame to run from the towing vehicle along the length of the trailer to the side running lights and to the tail lights. The electrical wiring is disposed on the interior surface of the C-shaped support beams to protect the wiring from damage from outside impact, abrasion, and contact from other objects, such as the feet of the boat operator when climbing on the trailer. The open slot of the C-shape support beam usually faces the longitudinal centerline of the trailer for appearance purposes so that the slot and the wires within the support beam usually are not visible to the casual observer.

Typically, the trailers for the larger boats and other heavy loads also include hydraulic brake fluid lines that communicate brake fluid from a brake actuator to the hydraulic brakes of the trailer. The hydraulic brake fluid lines also are disposed in the C-shape beam, and the extend from the hydraulic brakes at the wheels to a brake actuator at the front of the trailer, which can be on the tongue of the trailer or on the towing vehicle. As with the electrical wiring, the hydraulic brake fluid lines are disposed on the inside surface of the frame for reasons of both cost, wear and convenience in manufacture and repair.

A problem with a conventional boat trailer is that the electrical wiring and the hydraulic brake fluid lines are exposed to, among other things, the elements, rainwater, water from the lake or other body of water in which the boat is launched, sunlight, water splashed from the road, and road debris. It is desirable that the electrical wiring and the hydraulic brake fluid lines be protected. Also, it is desirable that the open slot of the support beams face outwardly from the longitudinal centerline of the trailer for the convenience of installation, maintenance and repair of the wires, brake fluid lines, etc.

Sometimes the boat manufacturer desires to have the color of trailer for the boat match or blend with the color of the boat. This requires the boat manufacturer or the trailer manufacturer to order the trailers ahead of time with the desired colors, or the manufacturer has an additional problem of matching his inventory of painted trailers with specific colors ordered by customers.

Thus, a heretofore, unaddressed need exists in the industry to address the aforementioned deficiencies and inadequacies.

SUMMARY OF THE INVENTION

The disadvantages of the prior art have been overcome by the present invention which basically includes a boat trailer having a frame including a pair of support beams that extend longitudinally, substantially parallel to each other on opposite sides of a longitudinal center-line of the boat. Each one of the support beams is generally C-shaped in cross section. The C-shape defines a generally open interior with a slot extending from the exterior of the support beam to the interior along the length of the support beam. The slot is defined by an upper front wall and a lower front wall that extend towards the other. Each one of the support beams is aligned such that the slot to the generally hollow interior faces away from the longitudinal centerline of the trailer.

The side panels are removably supported by the support beams in positions that cover and close the slots of the support beams. In one embodiment, the side panels are made from a resilient material such as plastic and are manufactured by an extrusion process. The side panels extend along the lengths of the support beams and include a front face and a rear face. The width of the front face is normally such that it substantially covers the upper front wall and the lower front wall of the slotted surface of the support beams, thereby closing the slot.

The side panels can be supported by various mounting means on the support beams to cover the slots. In one embodiment the rear face of a side panel includes a pair of resilient coupling flanges that extend outward and vertically, one pointed upwardly and one pointed downwardly for engaging the edges if the support beam. The rear face and the coupling flanges can define a pair of grooves with the width of each groove being less than the width of the upper front wall or the lower front wall.

A side panel can be mounted to one of the support beams by aligning one end of the side panel with the rear of the support beam such that the rear face of the side panel is aligned with the exterior surface of the support beam and the grooves of the side panel are approximately aligned with the interior surface of the upper front wall and the lower front wall. The side panel is then pushed forward. The thickness of the upper front wall and the lower front wall cause the coupling flanges to be bent slightly away from the rear face, which is abutting the exterior surface of the upper and lower front walls. The pressure created by bending the coupling flanges away from the rear face holds the side panel in place.

During the manufacture of the boat trailer, electrical wiring is run along the interior of the support beams from the tongue to brake light assemblies that are attached to the rear end of the support beams, and hydraulic brake fluid lines are run from the tongue along a portion of the interior of the support beams to hydraulic brakes. When the side panels are attached to the support beams, the side panels and the pair of support beams provide a pair of protective housings, which shield the electrical wiring and the hydraulic brake fluid lines from, among other things, the elements and from debris. In the course of routine maintenance, the side panels are readily removed from the support panels by sliding the side panels rearward, thereby exposing the hydraulic brake fluid lines and the electrical wiring.

In one embodiment, the side panels come in a variety of colors, which means that the boat manufacturer need not be concerned about the color of the boat trailers as they come off the assembly line. The boat trailer manufacturer need only apply side panels of appropriate color to a boat trailer before shipping the boat trailer to the boat manufacturer.

Similarly, a boat manufacture could order multiple boat trailers and multiple sets of side panels in various colors. In that case, the boat manufacturer could simply load a boat onto one of the boat trailers as the boat comes off the assembly line, and then matches the side panels for the trailer to the boat. Matching the color of the side panels to the boat after the boat has been loaded is simpler having multiple boat trailers sequentially aligned in a particular order so that they can receive boats of different colors as they come off of the assembly line.

In one embodiment, the boat trailer manufacturer has different types of side panels for different boat manufactures. Thus, the boat trailer can be customized for a particular boat trailer manufacturer such that the side panel includes the boat manufacturer's logo or other desired customization.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4A is a cross sectional view of a side panel and a support beam of the boat trailer.

FIG. 4B is a cross sectional view of a side panel and a support beam of the boat trailer.

DETAILED DESCRIPTION OF THE PREFERRED EMBODIMENTS

The preferred embodiments of the invention now will be described more fully hereinafter with reference to the accompanying drawings, in which preferred embodiments of the invention are shown.

Figure 1:
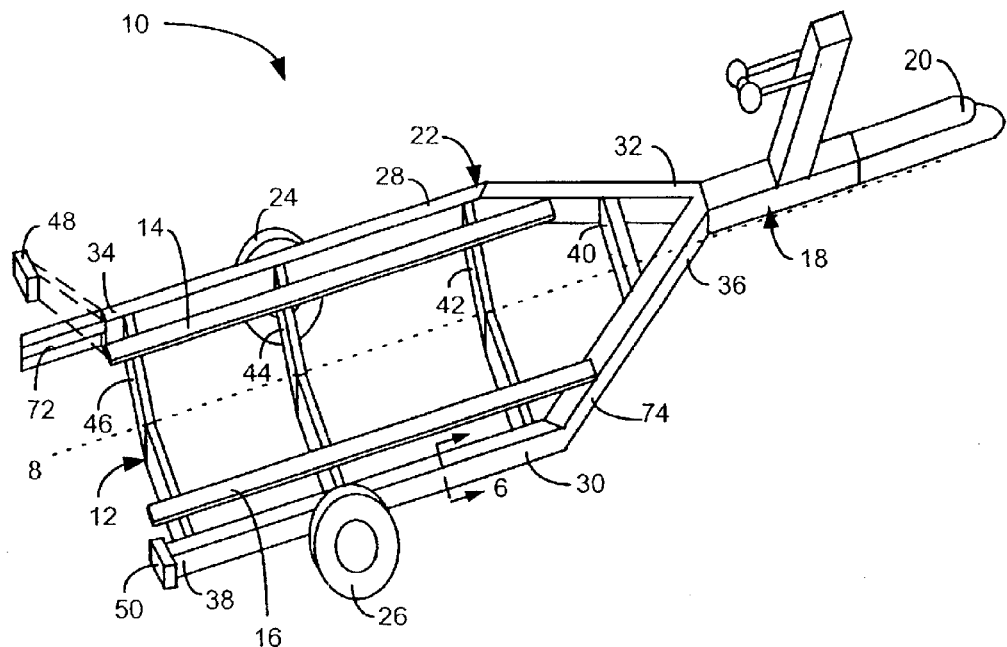
FIG. 1 is a partially exploded perspective view of a boat trailer.

A partially exploded boat trailer 10, which defines a longitudinal centerline shown as dashed line 8, is shown in FIG. 1. The boat trailer 10 includes a carriage 12 having a left bunk board 14 and a right bunk board 16. Extending from the carriage 12 is a tongue 18 having a hitch mount 20 for coupling to a hitch ball (not shown).

The carriage 12 is generally symmetric about the centerline 8 and includes a frame 22 mounted to a left wheel 24 and a right wheel 26. The wheels 24 and 26 are rotatably mounted to the carriage 12 via wheel mounts (not shown). Typically, the wheel mounts include hydraulic brakes (not shown) that are in hydraulic communication with a brake actuator (not shown).

The frame 22 includes a pair of elongated support beams; left support beam 28 and right support beam 30. The left support beam 28 defines a curved front end 32 and a rear end 34; the right support beam 30 defines a curved front end 36 and a rear end 38. The front ends 32 and 36 are rigidly attached to the tongue 18 and are curved such that together they define the bow shape of a boat. The support beams 28 and 30 extend rearwardly from their front ends such that the rear ends 34 and 38 are aligned approximately parallel to and approximately equidistant from the centerline 8. The frame 22 also includes cross-members 40, 42, 44, and 46, each of which are rigidly attached to the support beams 28 and 30. The cross-members 40, 42, 44, and 46 provide lateral support for the frame 22.

Coupled to the bunk board 14 is a pair of braces (not shown), a front brace and a rear brace, that extend down from the bunk board 14. The front brace (not shown) extends downward from the front portion of the bunk board 14 and removably couples to the cross member 42. The rear brace (not shown) extends downward from the rear portion of the bunk board 14 and removably couples to the cross member 46. Each one of the braces includes a plurality of vertically aligned holes for alignment with mounting holes (not shown) formed in the cross members 42 and 46. The distance between the bunk board 14 and the frame 22 is adjustable. The front brace is coupled to the cross member 42 by aligning one of the holes in the brace with the mounting hole in the cross member 42 and inserting a bolt (not shown) through the aligned holes. The height of the front portion of the bunk board 14 can be raised or lowered by simply aligning a different hole in the front brace with the mounting hole in cross member 42. The height of the rear portion of the bunk board 14 can raised or lowered in a similar fashion as the front. The right bunk board 16 is essentially identical to the left bunk board 14 and is also mounted to the frame 22 by adjustable braces (not shown).

The trailer 10 also includes left and right brake-light/turn-signal assemblies 48 and 50, respectively. The brake-light/turn-signal assemblies 48 and 50 are adapted to be removably mounted to the rear ends 34 and 38, respectively. The brake-light/turn-signal assemblies are in electrical communication with the brake actuator (not shown) via electrical wiring. When the brake actuator actuates the brakes, electrical current is supplied to the brake-light/turn-signal assemblies so that brake lights are actuated. Generally, the boat trailer 10 is in electrical communication with a towing vehicle (not shown), which provides the electrical current for the brake lights. In addition, the towing vehicle also supplies electrical current to the brake-light/turn-signal assemblies 48 and 50 for turn-signal lights that are included in the brake-light/turn-signal assemblies.

Figure 2:
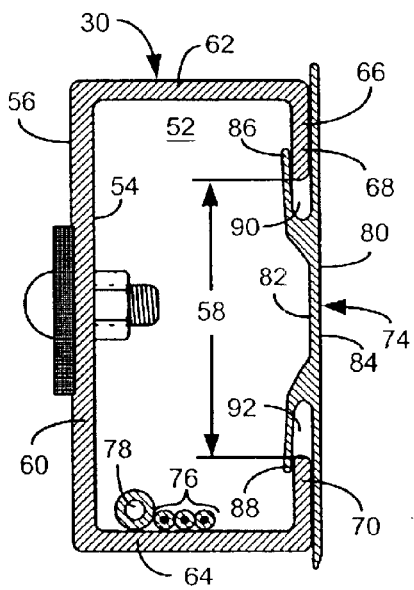
FIG. 2 is a cross sectional view of a side panel and a support beam of the boat trailer.

Referring to FIG. 2, which illustrates a cross sectional view of the right support beam 30 as viewed along dashed line 6 of FIG. 1, the support beams 28 and 30 are approximately C-shaped in cross section having a generally hollow interior 52 defined by an interior wall 54. Each one of the support beams has an exterior wall 56 having a longitudinal slot 58 that extends along the length of the support beam. The C-shape of the support beams is defined by a generally solid rear wall 60, a top wall 62 extending outward from the rear wall 60, a bottom wall 64 extending outward from the rear wall 60, and a front wall 66 having the slot 58 formed therein. The front wall 66 is defined by an upper front wall portion 68 that extends downward from the top wall 62 and a lower front wall portion 70 that extends upward from the bottom wall 64. The upper and lower front wall portions 68 and 70, respectively, define the slot 58. The support beams 28 and 30 are aligned such that the front wall 66 of each support beam 28 and 30 faces outward from the centerline 8.

The boat trailer 10 also includes a left and a right side panel, 72 and 74, respectively. A cross sectional view of the side panel 74 is shown in FIG. 2. Disposed in the interior 52 of support beam 30 is electrical wiring 76 for the brake-light/turn-signal assembly 50 and a hydraulic brake fluid line 78 for the right side brake (not shown). The support beam 28 also carries electrical wiring and a hydraulic brake fluid line in its hollow interior. Together a combination of a side panel and a support beam define a housing for the electrical wiring and hydraulic brake fluid line carried therein. With the side panel in operational position, the slot 58 is covered by the side panel, and consequently, the electrical wiring and hydraulic brake fluid line are protected from the elements, road debris, and from other hazards.

During the manufacturing process of the trailer 10, the electrical wiring and hydraulic brake fluid lines are disposed on the interior walls 54 of the support beams 28 and 30 prior to the side panels 72 and 74 being attached to the support beams. The slot 58 formed in each of the support beams provides easy access to the interior 52 of the support beams, which allows the manufacturer to efficiently and cheaply place the electrical wiring and hydraulic brake fluid lines therein.

In the preferred embodiment, the side panels are adapted to removably couple to the support beams. FIG. 1 shows the side panel 74 partially withdrawn from the support beam 28. By removing the side panels from the support beams, easy access to the electrical wiring and hydraulic brake fluid lines is obtained. Thus, the electrical wiring and hydraulic brake fluid lines can be easily accessed for routine maintenance or replacement.

In one preferred embodiment, the side panels are adapted to slideably mate with the support beams 28 and 30. Referring to FIG. 2, in one embodiment the side panel 74 includes a front face 80 and a rear face 82. The front face 80 faces outward from the centerline 8, and preferably, substantially covers the upper front wall 68 and lower front wall 70. In one preferred embodiment, a portion of the front face 80 is covered with a reflective safety coating 84. The front face 80 can also have logos or other identifying marks or markings thereon. The logos/markings can be formed onto the front face 80 or adhered thereto.

The rear face 82 abuts the upper front wall 68 and lower front wall 70 and is held thereon by pressure. A pair of coupling flanges 86 and 88 extend out and vertically from the approximate center of the rear face 82. The upper coupling flange 86 and rear face 82 define a slot 90. The lower coupling flange 88 and rear face 82 define a similar slot 92. The upper and lower coupling flanges 86 and 88 are made from a resilient material and, in relaxed position, the width of the slots 90 and 92 are less than the widths of the upper front wall 68 and lower front wall 70, respectively. In operational position, the coupling flanges are bent away from the rear face 82 by the thickness of the upper front wall 68 and lower front wall 70.

The side panel 74 is mated to the support beam 30 by aligning the slots 90 and 92 with the upper front wall 68 and the lower front wall 70, respectively, at the rear end 38, and pushing the side panel forward. Typically, the side panel 74 is a single side panel that extends from the rear end 38 to the front end 36 and is made from a material that will bend to conform to the curvature of the support beam 30. However, in an alternative embodiment, a side panel is made up of multiple segments, and together, the multiple segments extend along the length of the support beam 30. After the side panel 74 is in proper position, the brake-light/turn-signal assembly 50 is attached to the support beam 30. The brake-light/turn-signal assembly 50 covers the hollow interior 52 and overlaps the side panel, thereby preventing the side panel 74 from sliding rearward.

Figure 3:
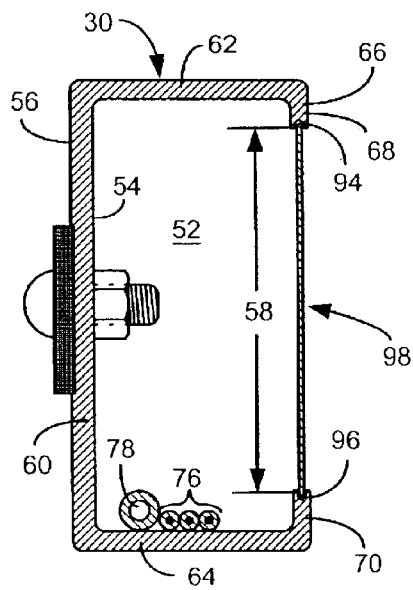
FIG. 3 is a cross sectional view of a side panel and a support beam of the boat trailer.

FIGS. 3–5 illustrate alternative embodiments for attaching a side panel to a support beam. Referring to FIG. 3, the upper and lower front walls 68 and 70 define a pair of vertically aligned grooves 94 and 96, respectively. Each groove extends along the length of the support beam. A side panel 98 extends between the grooves 94 and 96 along the length of the support beam, and the grooves 94 and 96 hold the side panel 98 in vertical alignment. The side panel 98 is adapted to fit within the grooves so that it can be pushed in to fill the slot 58 or pulled outward to expose the hollow interior 52.

In an alternative embodiment, the interlocking relationship between the side panel 98 and the upper and lower front walls 68 and 70, respectively, is reversed. The side panel 98 defines a pair of opposed grooves that extend along the length of the side panel, and the grooves are adapted to engage the upper and lower front walls 68 and 70 such that the side panel can be slid along the length of the support beam 30 to cover the slot 58.

Referring to FIG. 4A, in another alternative embodiment, the upper front wall 68 and lower front wall 70 define multiple upper tabs 100 and lower tabs 102, which are spaced along the length of the support beam. Each tab is formed by vertically cutting through the upper or lower front wall and bending the material between adjacent vertical cuts outward. The upper tabs 100 formed from the upper front wall 68 are angled outward and downward, and the lower tabs 102 formed from the lower front wall 70 are angled upward and outward. A side panel 104 extends along the front wall 66 between the upper and lower tabs 100 and 102. The side panel 104 is held in vertical alignment by the tabs such that the side panel 104 abuts the front wall 66.

Referring to FIG. 4B, in yet another alternative embodiment, the upper tabs 100 and lower tabs 102 are bent inward, instead of outward. In this embodiment, the side panel 104 rests between the tabs and abuts the interior wall 54.

FIGS. 2–4 are intended to be non-limiting examples for exemplary ways to removably couple the side panel to a support beam. Another example includes, but is not limited to, having holes in the front walls and matching holes in the side panels and attaching the side panel to the support beam via fasteners. Those skilled in the art will recognize other methods, which are intended to be within the scope of the invention, for attaching the side panel to a support beam.

Generally, the side panels are made from a resilient pliable material such as, but not limited to, plastic, or aluminum, or other material known to those skilled in the art. Generally, the side panels are made from colored materials or materials that can be painted. In one preferred embodiment, the side panels are made by an extrusion process.

In one preferred embodiment, a trailer manufacturer provides a boat manufacturer with multiple partially assembled boat trailers and multiple sets of side panels. Except for coupling side panels with the trailers and attaching the brake-light/turn-signal assemblies the boat trailers are delivered completely assembled. As the boats come off of the boat manufacturer's assembly line, each boat is placed on a trailer, then an appropriate set of side panels is mated with the boat trailer, and then the brake-light/turn-signal assemblies are attached. This method of manufacture enables the boat manufacture to efficiently match the color of the trailer to the color of the boat carried thereon. Instead of having to have a specific color of boat trailer for a specific color of boat, the manufacture can easily apply custom side panels or matching side panels after the boat is loaded onto the trailer.

It should be emphasized that the above-described embodiments of the present invention, particularly, any "preferred" embodiments, are merely possible examples of implentations, merely set forth for a clear understanding of the principles of the invention. Variations and modifications may be made to the above-described embodiment(s) of the invention without departing from the spirit and principles of the invention. All such modifications are variations are intended to be included herein within the scope of this disclosure and the present invention and protected by the following claims.

What is claimed is:

1. A trailer for hauling boats, the trailer comprising:
    a frame having a pair of opposed support beams extending about a centerline, each support beam is generally C-shaped in cross section and defines a generally hollow interior, and each support beam having a front end and a rear end and a pair of opposed front walls that define a slot extending between the front end and the rear end, the slot providing an opening to the generally hollow interior of the support beam and facing outward from the centerline;
    a pair of opposed light assemblies, each one of the light assemblies removably mounted to the rear end of one of the support beams such that the light assembly substantially covers the rear end;
    a first set of wires extending along the hollow interior of one of the support beams and in communication with the light assembly mounted thereto, and a second set of wires extending along the hollow interior of the other support beam and in communication with the light assembly mounted thereto;
    a pair of side panels for mounting to the front walls of the pair of opposed support beams, wherein one side panel substantially covers the slot of one of the support beams and the other side panel substantially covers the slot of the other support beam;
    means for slidably mounting the pair side panels to the pair of opposed support beams,
    whereby each support beam having one of the side panels mounted thereto defines a housing for protecting the wires therein.

2. The trailer of claim 1 wherein the means for slidably mounting the pair of side panels to the pair of opposed support beams comprises:
    at least one of the side panels has a rear face having opposed coupling flanges extending therefrom,
    said opposed coupling flanges and rear face defining slots configured to slidably engage the opposed front walls of one of support beams so that the side panel can be moved along the length of one of the support beams to open and close the interior space of one of the support beams.

3. The trailer of claim 1, wherein at least one panel includes opposed edges, and the opposed edges of the side panel and the opposed front walls of one of the support beams includes interengaging shapes for slidably mating together.

4. The trailer of claim 1, wherein the means for slidably mounting the pair of side panels to the pair of opposed support beams comprises:
    at least one of the opposed support beam having a plurality of opposed tabs extending from the opposed front walls of the support beam, at least one of the side panels adapted to slide between the opposed tabs so that the side panel can be moved along the length of the support beam to open and close the interior space of the support beam.

5. The trailer of claim 1, wherein at least one of the light assemblies at least partially covers an end of one of the side panels such that the side panel cannot be slid off of the support beam to which it is mated while the light assembly is mounted to the support beam.

6. An improved trailer for hauling boats and the like, comprising:
    an elongated framework defining a longitudinal centerline, a front portion for connection to a towing vehicle and a rear portion for trailing behind the towing vehicle,
    wheels mounted to said framework on opposite sides of said centerline at said trailing portion for supporting said framework on a road surface,
    said framework including a pair of elongated support beams extending approximately parallel to each other and straddling said longitudinal centerline for supporting a load placed on said trailer,
    the improvement therein comprising:
        at least one of said elongated support beams formed in a C-shape in cross section defining an interior space and including opposed front walls extending toward each other and said opposed front walls defining a slot therebetween,
    said slot of said elongated support beam facing away from said centerline,
    electrical conductor wires positioned in and extending along said interior space of said support beam.
        a side panel for mounting to said opposed front walls of said elongated support beam that closes said slot, and
    means interengaging between said side panel and said opposed front walls for slidably mounting said side panel to said opposed front walls of said elongated support beams such that the side panel is slidable alone the support beam,
        whereby said elongated support beam having said side panel mounted thereto define a housing for hiding wires extending along the interior space of the elongated support beam from view by the panel.

7. The trailer of claim 6, wherein said support beam is curved and said side panel is flexible and resilient so that said side panel can follow the curvature of said elongated support beam.

8. The trailer of claim 6, wherein said side panel has opposed front and rear faces and said front face has light reflective material thereon.

9. The trailer of claim 6, wherein said side panel is flexible and can be bent to change its shape when being mounted to an elongated support beam.

10. The trailer of claim 6, wherein said means for slidably mounting said side panel to said opposed front walls of said elongated support beam comprises said side panel including opposed edges, and said opposed edges of said panel and said opposed front walls of said elongated support beam include interengaging shapes for slidably mating together.

11. The trailer of claim 6, wherein said side panel is selected from a supply of side panels of different colors so that said side panel can match the color of the load to be carried by said trailer.

12. The trailer of claim 6, wherein said side panel has opposed front and rear faces, and said front face has identifying marks thereon.

13. The trailer of claim 6, wherein said means for slidably mounting said panel to said opposed front walls of said elongated support beam comprises:
    said opposed front walls having a plurality of opposed tabs extending therefrom, said side panel adapted to slide between the opposed tabs so that said side panel can be moved along the length of said elongated support beam to open and close the interior space of said elongated support beam.

14. An improved trailer for hauling boats and the like, comprising:

an elongated framework defining a longitudinal centerline, a front portion for connection to a towing vehicle and a rear portion for trailing behind the towing vehicle, wheels mounted to said framework on opposite sides of said centerline at said trailing portion for supporting said framework on a road surface, said framework including a pair of elongated support beams extending approximately parallel to each other and straddling said longitudinal centerline for supporting a load placed on said trailer, the improvement therein comprising:

at least one of said elongated support beams formed in a C-shape in cross section defining an interior space and including opposed front walls extending toward each other and said opposed front walls defining a slot therebetween, said slot of said elongated support beam facing away from said centerline, a side panel for mounting to said opposed front walls of said elongated support beam that closes said slot, said side panel having a rear face having opposed coupling flanges extending therefrom, said opposed coupling flanges and rear face defining slots configured to slidably engage said opposed front walls of said elongated support beam so that said side panel can be moved along the length of said elongated support beam to open and close the interior space of said elongated support beam, whereby said elongated support beam having said side panel mounted thereto define a housing for hiding wires extending alone the interior space of the elongated support beam from view by the panel.

15. A trailer for hauling boats and the like behind a towing vehicle, comprising:

an elongated framework defining a longitudinal centerline, a front portion for connection to the towing vehicle and a rear portion for trailing behind the towing vehicle, wheels mounted to said framework on opposite sides of said centerline at said rear portion of said framework for supporting said framework on a road surface, said framework including a pair of elongated support beams extending approximately parallel to each other and straddling the centerline, the improvement therein comprising:

at least one of said elongated support beams formed in a C-shaped in cross section defining an interior space and including opposed front walls extending toward each other, said opposed front walls of said elongated support beam defining a slot there between with said slot facing away from said longitudinal centerline, electrical conductor wires positioned in said interior space, and a panel slidably mounted to said support beam and closing said slot, such that said electrical conductor wires are hidden from view.

16. The trailer of claim 15, and further including bunk boards supported by said pair of support beams.

* * * * *